United States Patent
Alexander et al.

(10) Patent No.: US 7,017,220 B2
(45) Date of Patent: Mar. 28, 2006

(54) SPRING COUNTERBALANCE METHOD AND APPARATUS FOR VARIABLY BIASING A DOCK LEVELER

(75) Inventors: James C. Alexander, Coppell, TX (US); Richard K. Hoofard, Dallas, TX (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/664,971

(22) Filed: Sep. 22, 2003

(65) Prior Publication Data

US 2005/0060821 A1    Mar. 24, 2005

(51) Int. Cl.
  *E01D 1/00*    (2006.01)
(52) U.S. Cl. ............... 14/69.5; 14/71.1; 14/71.3
(58) Field of Classification Search ........... 14/69.5, 14/71.1, 71.3–71.5; 52/173.2
  See application file for complete search history.

(56) References Cited

U.S. PATENT DOCUMENTS

| 796,933 | A | * | 8/1905 | Reed ................... 49/7 |
| 3,122,764 | A | | 3/1964 | Ambli .................. 14/71 |
| 3,334,368 | A | | 8/1967 | McIntosh et al. ........ 14/71 |
| 3,368,229 | A | | 2/1968 | Pfleger ................ 14/71 |
| 3,411,168 | A | | 11/1968 | Hecker, Jr. |
| 3,460,175 | A | | 8/1969 | Beckwith, et al. |
| 3,475,778 | A | | 11/1969 | Merrick et al. ......... 14/71 |
| 3,636,578 | A | | 1/1972 | Dieter ................. 14/71.3 |
| 3,639,935 | A | | 2/1972 | Kumpolt ............... 14/72 |
| 3,766,585 | A | | 10/1973 | Yoon .................. 14/72 |
| 4,525,887 | A | * | 7/1985 | Erlandsson et al. ..... 14/71.3 |
| 4,665,579 | A | | 5/1987 | Bennett et al. ......... 14/71.1 |
| 4,689,846 | A | | 9/1987 | Sherrod ............... 14/71.3 |
| 4,776,052 | A | * | 10/1988 | Delgado et al. ........ 14/71.3 |
| 4,825,493 | A | | 5/1989 | Nguyen ................ 14/71.3 |
| 4,928,340 | A | | 5/1990 | Alexander ............. 14/71.3 |
| 5,001,799 | A | | 3/1991 | Alexander et al. ...... 14/71.1 |
| 5,117,526 | A | | 6/1992 | Alexander ............. 14/71.1 |
| 5,313,681 | A | | 5/1994 | Alexander ............. 14/71.1 |
| 5,335,451 | A | * | 8/1994 | Druzynski ............. 49/379 |
| 5,396,676 | A | | 3/1995 | Alexander et al. ...... 14/71.1 |
| 5,586,355 | A | | 12/1996 | Metz et al. ........... 14/69.5 |
| 6,205,606 | B1 | | 3/2001 | Zibella et al. ........ 14/71.3 |

OTHER PUBLICATIONS

Mrs. Baird's Bread Plant Photographs.
Serco Brochure regarding R&M Series, pp. 1-3.
Serco Brochure regarding "E" Series, pp. 1-2.
Serco Brochure regarding later "E" Series, pp. 1-2.

* cited by examiner

*Primary Examiner*—Raymond Addie
(74) *Attorney, Agent, or Firm*—Baker & Hostetler LLP

(57) ABSTRACT

A counter balance mechanism for a mechanically-operated, vertically-storing dock leveler that can upwardly bias the dock leveler at desired angles of rotation and downwardly bias the dock leveler at other angles of rotation, and neutrally bias the dock leveler at yet other angles of rotation. A method for assisting the operation of a mechanically-operated, vertically-storing dock leveler of desirable simplicity is also provided.

16 Claims, 5 Drawing Sheets

(PRESENT INVENTION)
COUNTERBALANCE MOMENTS

SPRING COUNTERBALANCE METHOD AND APPARATUS FOR VARIABLY BIASING A DOCK LEVELER

FIELD OF THE INVENTION

The present invention relates generally to dock levelers. More particularly, the present invention relates to mechanically-operated, vertically-storing dock levelers having a spring counter balance.

BACKGROUND OF THE INVENTION

U.S. Pat. No. 3,411,168 is an example of a mechanically-operated, vertically-storing dock leveler. The illustrated dock leveler includes a spring counterbalance to assist in operation. The spring counterbalance mechanism includes a spring, a roller, a cam and an arm. The spring counterbalance tends to urge the dock leveler into the stored, vertical position. During operation, as the dock leveler rotates toward an operative position, the weight moment of the dock leveler overcomes the upward bias of the spring counterbalance and the dock leveler falls into its operative position.

U.S. Pat. No. 3,460,175 is another example of a mechanically-operated, vertically-storing dock leveler. The illustrated dock leveler includes both a spring counterbalance and pivotable weight to assist in operation. The spring counterbalance includes a spring, cam, and cam roller. The spring counterbalance upwardly biases the dock leveler, whereas the weight downwardly biases the dock leveler when the weight is rotated into its high moment position. In operation, when the dock leveler is rotated toward the horizontal position, the weight rotates from its low moment position to its high moment position. According to the specification, when the weight is in the high moment position, the moment about the pivotal connection of the ramp to the support means is sufficient to overcome the upward biasing action of the spring so that the ramp remains in the horizontal position. To re-store the dock leveler, the weight is rotated from the high moment position to the low moment position. According to the specification, when the weight is in the low moment position, the force provided by the spring is sufficient to rotate the dock leveler into the stored, vertical position.

A drawback of the above-described dock levelers is that the spring counterbalance upwardly biases the dock leveler throughout the rotation of the dock leveler. Accordingly, rotation of the dock leveler downward is made more difficult because the motion is against the force of the spring. Another drawback of the above-described dock levelers is that they require additional components such as the arm and cam roller.

Accordingly, it is desirable to provide a spring counterbalance method and apparatus for assisting the operation of a mechanically-operated, vertically-storing dock leveler that can upwardly bias the dock leveler at certain angles of rotation, downwardly bias the dock leveler at other angles of rotation, and/or neutrally bias the dock leveler at yet other angles of rotation. It is also desirable to provide a method and apparatus for assisting the operation of a mechanically-operated, vertically-storing dock leveler of desirable simplicity.

SUMMARY OF THE INVENTION

The foregoing needs are met, to a great extent, by the present invention, wherein in one aspect an apparatus is provided that in some embodiments can upwardly bias the dock leveler at certain angles of rotation, downwardly bias the dock leveler at other angles of rotation, and/or neutrally bias the dock leveler at yet other angles of rotation.

In accordance with one embodiment of the present invention, a dock leveler is provided that includes: a base assembly; a ramp assembly configured to rotate from a generally vertical stored position to one or more lowered supported positions, wherein the ramp assembly is pivotally coupled to the base assembly at a pivot point; and, a counterbalance assembly comprising: a first anchor point, a second anchor point, at least one effective anchor point, and a biasing member having a central longitudinal axis defining a line of action, wherein the biasing member is coupled to the ramp assembly at the first anchor point and to the base assembly or dock at the second anchor point and wherein the at least one effective anchor point has a location along the line of action, and which location relative to the pivot point changes as the ramp assembly rotates. According to some embodiments, the biasing member is a spring. According to some embodiments, the spring is coupled to the second anchor point by a flexible member and the base assembly comprises a cam plate having at least one cam surface shaped to deflect the line of action as the ramp assembly rotates by selectively engaging the flexible member.

In accordance with another embodiment of the present invention, a counterbalance assembly for a mechanically-operated, vertically-storing dock leveler is provided. The counterbalance assembly includes: a tension means for counterbalancing the ramp assembly of a dock leveler, wherein the tension means has a first end and a second end; a means for fixedly coupling the first end of the tension means to the ramp assembly at a first anchor point; a means for flexibly coupling the second end of the tension means to a base assembly of the dock leveler at a second anchor point, wherein the first anchor point and the second anchor point define a direct line of action; and a camming means configured to selectively engage the means for flexibly coupling such that the tension means is deflected away from the direct line of action when the tension means is incorporated in the dock leveler and the ramp assembly rotates.

In accordance with yet another embodiment of the present invention, a method for counterbalancing a mechanically-operating, vertically-storing dock leveler having a rotating ramp assembly attached to a base assembly at a pivot point is provided. The method includes coupling a spring to the dock leveler with a flexible attachment device, and providing a camming surface configured to cooperate with the flexible attachment device to deflect the spring away from a direct line of action in response to the ramp assembly rotation. In some embodiments, the camming surface is shaped to cause the spring to deflect toward the pivot point as the ramp assembly rotates downward. "Direct line of action" should be understood to mean the straight line defined by the fixed anchor points to which the spring is coupled, which may or may not overlap the "line of action" defined by the central longitudinal axis of the spring.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
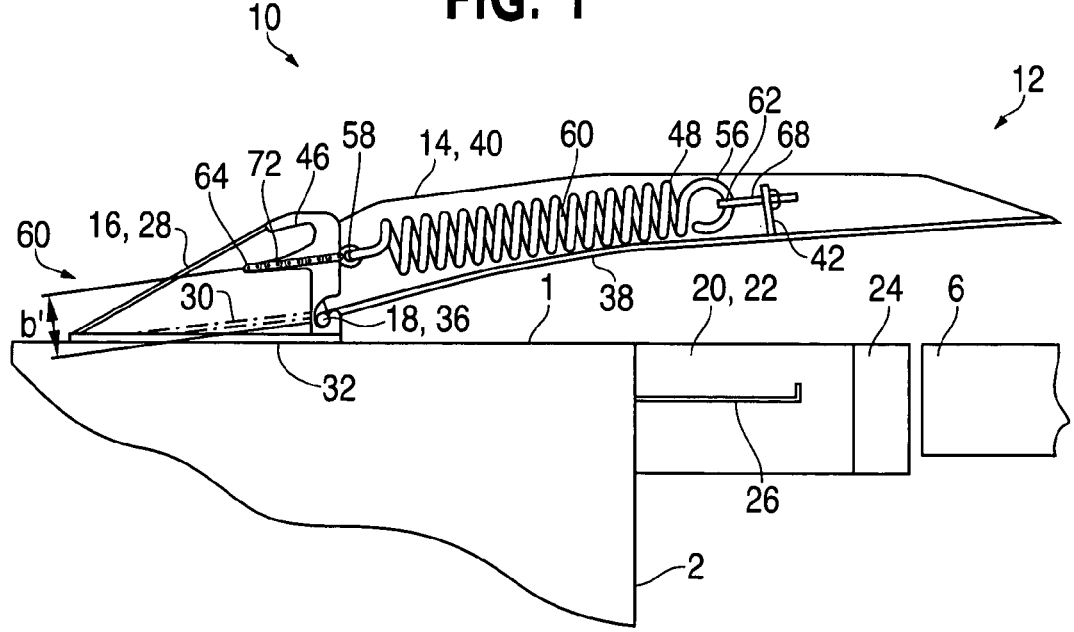
FIG. 1 is a side view illustrating a dock leveler incorporating a counterbalance mechanism according to a preferred embodiment of the invention, wherein the dock leveler is lowered near the generally horizontal operative position.

The invention will now be described with reference to the drawing figures, in which like reference numerals refer to like parts throughout. An embodiment in accordance with the present invention provides a counterbalance assembly for use with a mechanically-operated, vertically-storing dock leveler having a ramp assembly connected to a base assembly at a pivot point, wherein the counterbalance assembly comprises a spring counterbalance configured for attachment to the ramp assembly of a dock leveler at one end and for attachment to the base assembly of the dock leveler or to the dock itself at the other end. The longitudinal central axis of the spring defines a line of action, and the spring is attached at both ends to the dock leveler or at one end to the dock leveler and at the other end to the dock in such a manner that the position of the line of action relative to the direct line of action can change as the ramp assembly rotates. Such a counterbalance assembly can upwardly bias the dock leveler at certain angles of rotation, downwardly bias the dock leveler at other angles of rotation, and/or neutrally bias the dock leveler at yet other angles of rotation.

An embodiment of the present inventive counterbalance assembly 10 is shown incorporated into a vertically-storing, mechanically-operated dock leveler 12 in FIG. 1. The dock leveler 12 is shown positioned at a loading dock having a dock floor 1 and a dock face 2. The dock leveler 12 is adapted to bridge the gap between the loading dock and the bed of a transport vehicle 6 parked in front of the loading dock.

On either side of the dock leveler 12, a bumper assembly 20 is attached to the dock face 2. The bumper assembly 20 includes a bumper bracket 22 and a resilient bumper 24. The bumper assembly 20 protects the dock face 2 from impact and positions the transport vehicle 6 at the desired position relative to the dock leveler 12. A shelf 26 is supported between the bumper assemblies 20.

The dock leveler 12 includes a ramp assembly 14 which is pivotally connected to a base assembly 16 at a pivot point 18, allowing the ramp assembly 14 to rotate from a generally vertical stored position to one or more lowered operating positions. That is, for example, the ramp assembly 14 is movable between a generally vertical stored position (shown in FIG. 3) and a generally horizontal operative position that may be upwardly inclined (shown in FIG. 1) or downwardly declined (shown in FIG. 4) to provide a bridge from the dock floor 1 to a transport vehicle 6 that may be higher or lower than the dock floor 1.

In some embodiments of the invention, the generally horizontal working range includes positions where an end of the ramp assembly 14 is about eight inches above horizontal to a position where the end of the ramp assembly 14 is about eight inches below horizontal.

The base assembly 16 is mounted to the dock floor 1. As illustrated, the base assembly 16 includes two side plates 28 and an inclined ramp plate 30. Each side plate 28 is mounted to a base plate 32 that is attached to the dock floor 1. Each side plate has a bearing surface 34 to support the pivot shaft 36 of the ramp assembly 14. The inclined ramp plate 30 extends from the dock floor 1 to the pivoting end of the ramp assembly 14.

The ramp assembly 14 includes a deck plate 38 supported by side curbs 40. A pivot shaft 36 is attached at one end of the deck plate 38 and is supported at each end by the bearing surface 34 of each side plate 28. Attached to each side curb 40 is a spring anchor bracket 42.

The counterbalance assembly 10 includes a cam plate 46 and a spring 48. The cam plate 46 is mounted to each base plate 32 outboard of each side plate 28. The cam plate has an anchor hole 50, an upper cam surface 52, and a lower cam surface 54.

Figure 3:
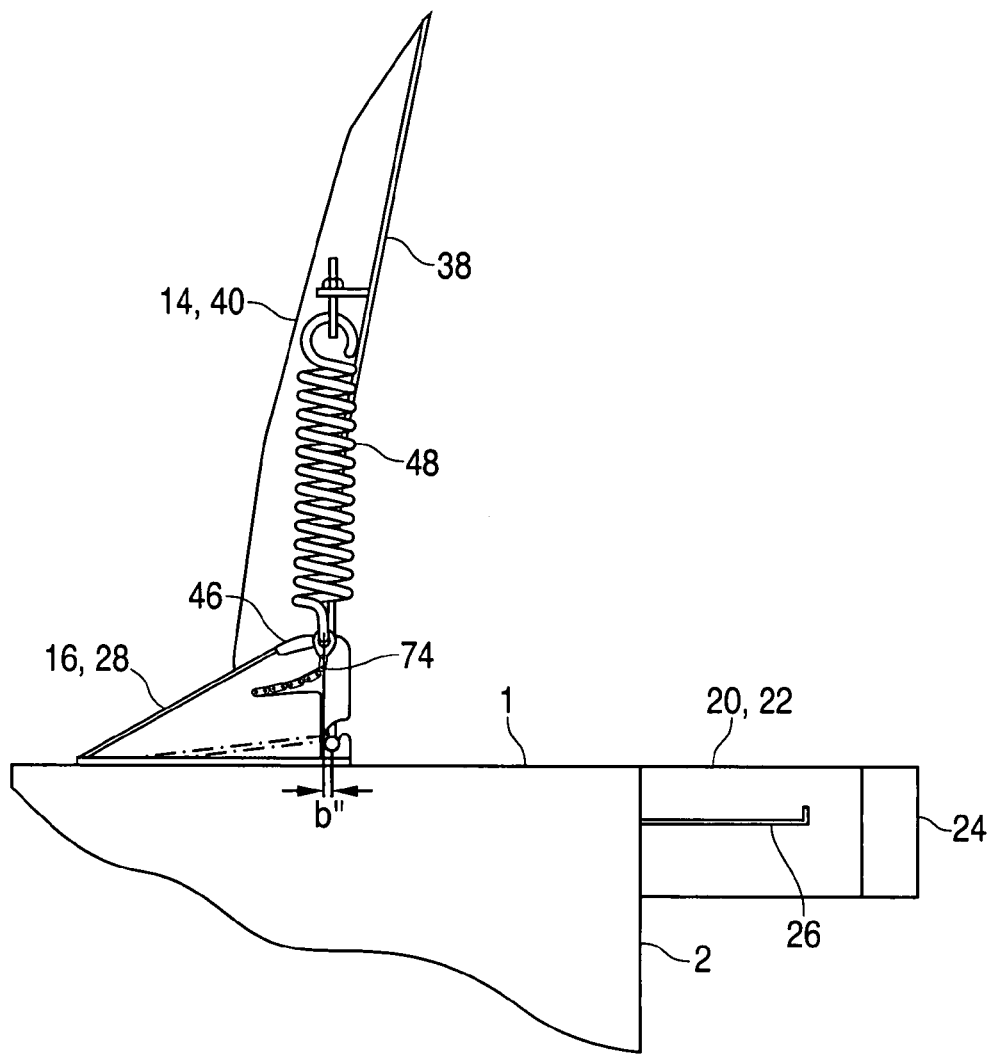
FIG. 3 is a side view illustrating the dock leveler of FIG. 1 in the vertical stored position.
Figure 4:
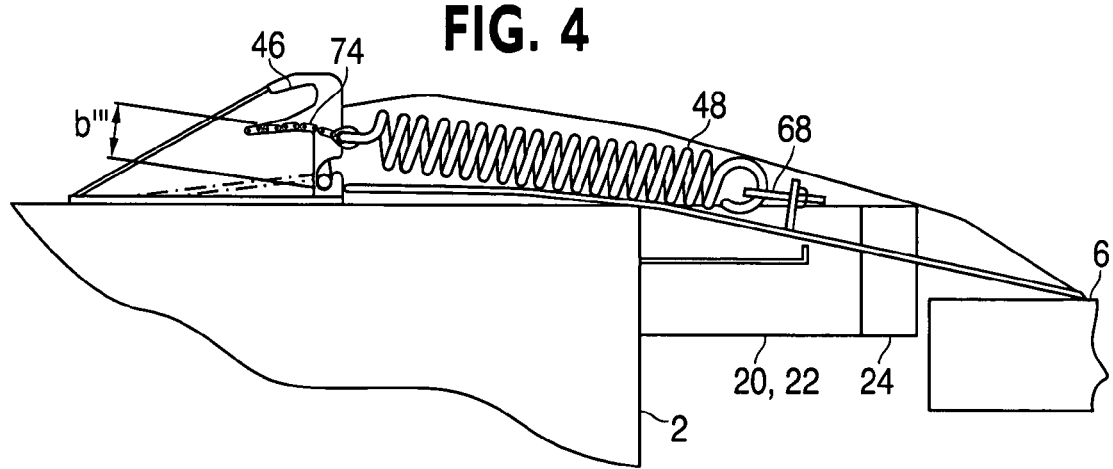
FIG. 4 is a side view of the dock leveler of FIG. 1 in the lowest operative position.

The spring 48 is coupled at one end 56 to the ramp assembly 14 and at the other end 58 to the base assembly 16. The spring 48 has a central longitudinal axis 60 defining a line of action (also 60). The spring 48 is coupled to the ramp assembly 14 at a first anchor point 62 and to the base assembly 16 at a second anchor point 64. The line defined by the first and second anchor points 62, 64 is the direct line of action. The spring 48 is coupled to the anchor points 62, 64 in such a manner that the position of the line of action 60 can be deflected way from the direct line of action as the ramp assembly 14 rotates from the vertically-stored position (shown in FIG. 3) to the one or more lowered operative positions (examples of which are shown in FIGS. 1 and 4). It should be understood that although the second anchor point is shown as located on the base assembly 16, it could also be located on the dock itself.

In the illustrated embodiment, the particular coupling is accomplished by fixedly attaching the upper end 56 of the spring 48 to an adjusting bolt 68 attached to a spring anchor bracket 42. The lower end 58 of the spring 48 is flexibly attached to one end of a chain 72. The other end of the chain 72 is attached to the anchor hole 50 in the cam plate 46. Although the spring 48 is illustrated as being coupled to the base assembly 16 by a chain 72, any flexible anchor tensile member such as a cable or a band would serve the same purpose.

As the ramp assembly 14 rotates downward, the direct line of action moves closer to the pivot shaft 36 by virtue of the geometry of the fixed anchor points and pivot point. The interaction of the flexible chain 72 and camming surfaces 52, 54 together operate to deflect the line of action 60 of the spring 48 away from the direct line of action. That is, as the ramp assembly 14 rotates, the upper and lower camming surfaces 52, 54 selectively engage the flexible chain 72 shifting the location of the effective anchor point 74.

The term "effective anchor point" is the point of attachment of the end of a spring, which point's location can move as the ramp assembly 14 rotates. Thus, for example, in the illustrated embodiment, the "effective anchor point" is the lower end 58 of the spring 48, because, as shown in FIGS. 1–4, the location of the point 74 changes as the ramp assembly 14 rotates. By contrast because the upper end 58 of the spring 48 is fixedly attached to the ramp assembly, that point of attachment is termed an anchor point rather than "effective" anchor point. It should be noted that the "effective anchor point" may or may not be a true anchor point, that is a point at which the spring 48 is directly coupled to the dock leveler 12. That is if spring end is directly coupled to the dock leveler 12 and that point of attachment is moveable, it can then be an effective anchor point.

As illustrated in FIG. 1, the weight moment of the ramp assembly 14 is opposed by the moment of the spring force acting at a distance b' from the pivot shaft 36. The position of the anchor hole 50 in the cam plate 46 and the rate of the spring 48 are selected to provide the desired magnitude of the counter balancing moment. As indicated above, as the ramp assembly 14 rotates downward, the line of action 60 of the spring 48 will move closer to the pivot shaft 36, and the force of the spring 48 will increase in proportion to the deflection of the spring 48. Preferably, the position of the anchor hole 50 in the cam plate 46 and the rate of the spring 48 are chosen to allow the spring counter balance moment to approximate the weight moment of the ramp assembly 14. However, as the ramp assembly 14 continues to rotate downward, the distance b' between the line of action of the spring 48 and a parallel line drawn through the pivot shaft 36 decreases faster than the force of the spring 48 increases.

FIG. 4 illustrates the ramp assembly 14 rotated to the lowest operative position. The chain 72 is supported by the lower cam surface 54 and causes the line of action of the spring force to be moved to a distance b''' from the pivot shaft 36. The distance b''' is greater than the distance from the pivot shaft 36 to a line connecting the anchor hole 50 and the spring anchor 62. Therefore the spring counter balance moment is increased to the desired value.

Figure 2:
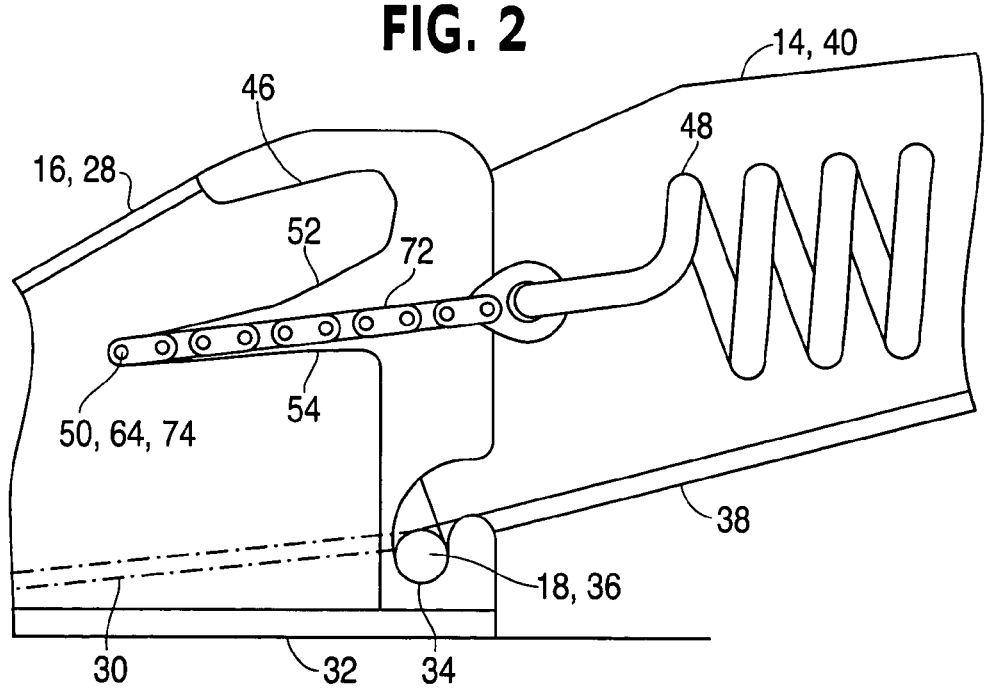
FIG. 2 is an enlarged partial view of the counterbalance mechanism of FIG. 1.

Referring to FIGS. 1 and 2, as the ramp assembly 14 rotates upward, the line of force of the spring 48 moves farther above the pivot shaft 36 and the force of the spring 48 decreases in proportion to the deflection of the spring 48. As the ramp assembly 14 continues to rotate upward, the distance b' between the line of action 60 of the spring 48 and the pivot shaft 36 increases faster than the force of the spring 48 decreases. In addition the weight moment of the ramp assembly 14 decreases as it moves to a more vertical position. FIG. 3 illustrates the ramp assembly 14 rotated to the vertical stored position. The chain 72 is supported by the upper cam surface 52 and causes the line of action 60 of the spring force to be moved to a distance b'' from the pivot shaft 36. The distance b'' is less than the distance from the pivot shaft 36 to a line connecting the anchor hole 50 and the spring anchor 62. Therefore the spring counter balance moment is decreased to the desired value.

The use of cam surfaces to modify the spring counter balance moment provides design flexibility. Not only may the spring counter balance moment be matched to the weight moment of the ramp assembly 14, but also it may be selected to provide other features. For example, the shape of the lower cam surface 54 may be selected to provide a spring counter balance moment that is less than the weight moment when the ramp assembly 14 is in the operative position so that it will rest securely on the truck bed. The shape of the upper cam surface 52 may be selected to provide a spring counter balance moment that is greater than the weight moment when the ramp assembly 14 is above the operative position so that it will rise easily to the stored position. Also the shape of the upper portion of the upper cam surface 52 may be selected so that the spring counter balance moment is almost equal to the weight moment when the ramp assembly 14 is in the stored position. This will allow the operator to easily move the ramp assembly 14 to or from the stored position.

Figure 5:
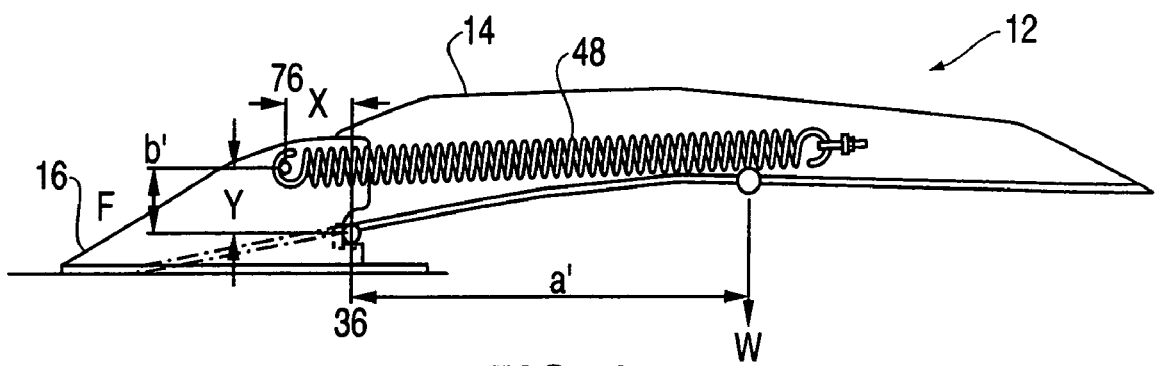
FIG. 5 illustrates a preliminary configuration of a tension spring counter balance mechanism with the dock leveler in a lowered working position.

Without being bound by theory, following is a more technical description of the present invention relative to a prior art spring counter balance mechanism. FIG. 5 illustrates a preliminary configuration of a tension spring counter balance mechanism with one end of the spring 48 connected to a ramp assembly 14 and the other end to base assembly 16 and with the dock leveler 12 in a lowered working position. This preliminary configuration is an advancement over the prior art described above in that it at least eliminates the cam, roller, and arm. The weight of the dock leveler 12 is illustrated by arrow W acting downward through the center of gravity ("CG") of the dock leveler 12. The dimension a' indicates the horizontal distance from the CG to the pivot shaft 36 of the dock leveler 12. The resulting rotational moment is the product of the weight W multiplied by the distance a'. The rotational moment of the weight of the dock leveler 12 varies from a maximum when the CG is in the horizontal plane of the pivot shaft 36 to zero when the CG is in the vertical plane of the pivot shaft 36. The magnitude varies as the cosine of the angle of rotation of the CG measured from the horizontal plane.

Still referring to FIG. 5, the spring 48 is anchored to the base assembly 16 by a pin 76 located relative to the pivot shaft 36 at horizontal and vertical dimensions of X and Y respectively. The force of the spring 48 is illustrated by the arrow F acting through the center of the spring 48. The dimension b' indicates the perpendicular distance from the pivot shaft 36 to the line of force of the spring 48. The rotational moment of the spring 48 acting on the dock leveler 12 is the product of the force F multiplied by the distance b'.

Figure 6:
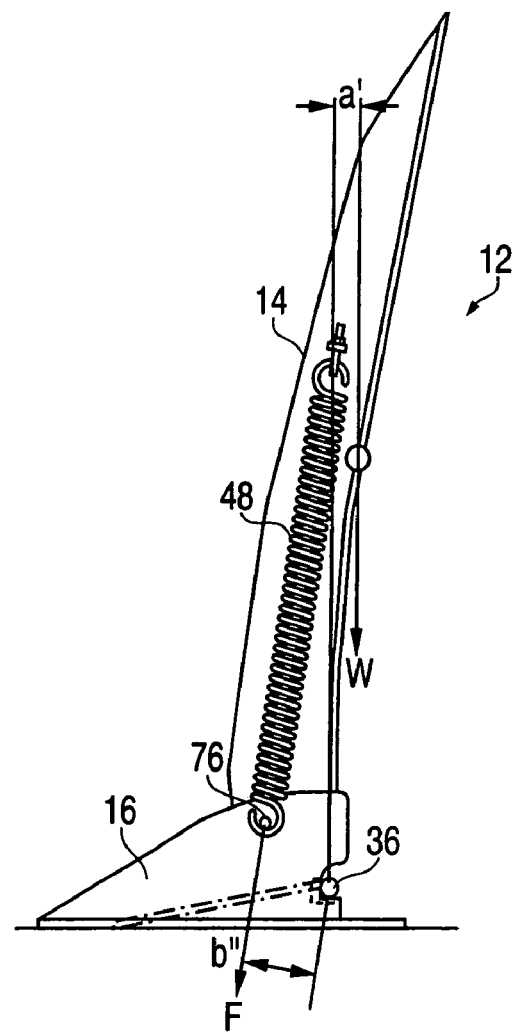
FIG. 6 illustrates the preliminary configuration of a tension spring counter balance mechanism of FIG. 5 with the dock leveler in the stored position.

FIG. 6 illustrates the preliminary configuration of the spring counter balance mechanism with the dock leveler 12 in a vertical stored position. As illustrated, the CG of the dock leveler 12 is almost directly over the pivot shaft 36 and the horizontal distance b'' from the CG to the pivot shaft 36 is very small. However, the distance b'' from the pivot shaft 36 to the line of action of the spring force is still large and even a small spring force will produce a significant upwardly biased spring moment.

Although the magnitude of the spring moment can be varied by changing the spring rate, the spring tension, or the position of the anchor pin 76 relative to the pivot shaft 36, the nature of the geometry is that none of the variables can be configured to cause the spring counter balance moment to match the rotational moment of the weight of the dock leveler 12. Altering the parameters may change the relative shape of the spring moment curve relative to the weight moment curve. However, selection of parameters provides specific values only at two positions relative to the weight moment curve.

Figure 7:
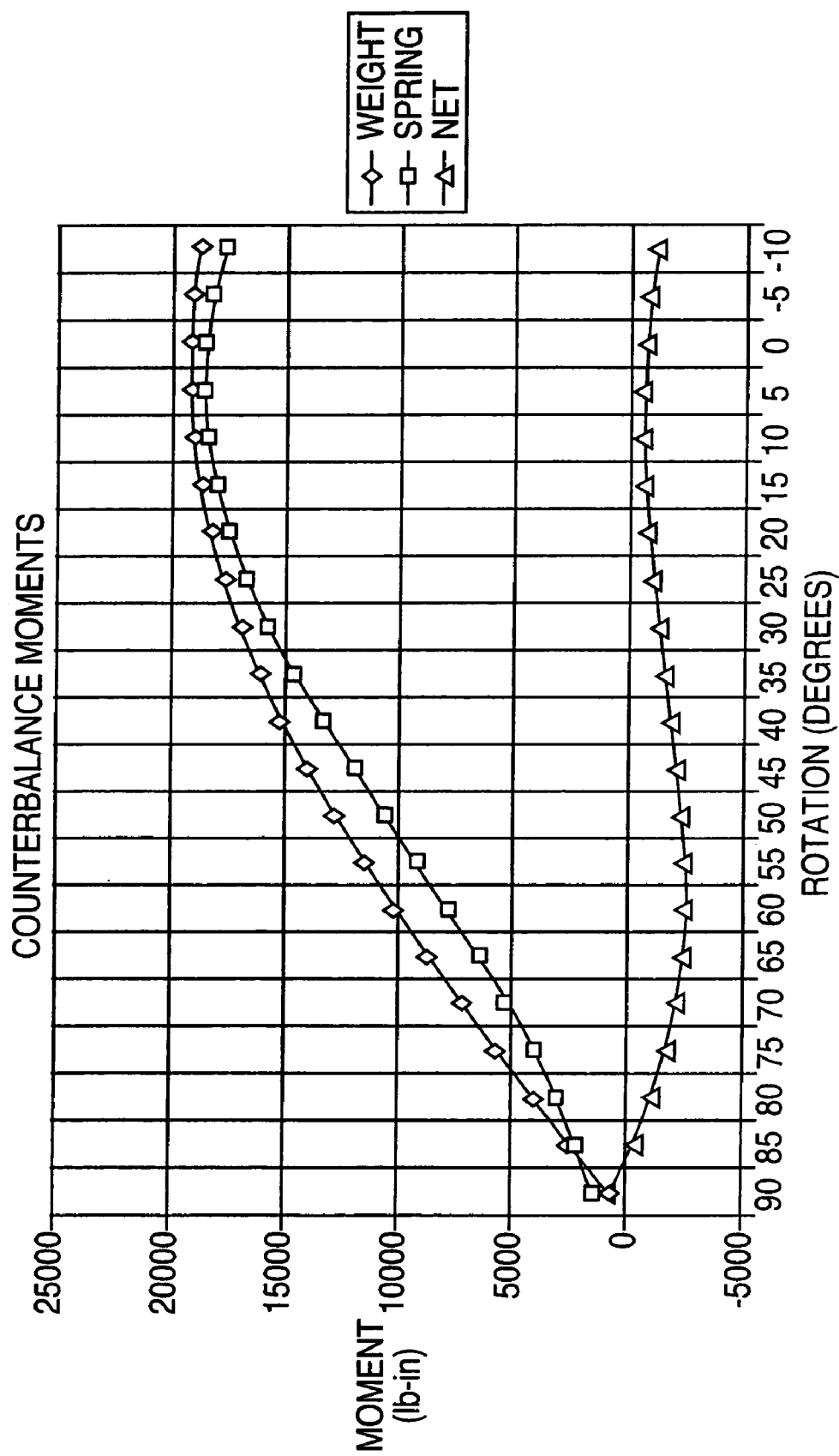
FIG. 7 is a graphical illustration of the relative magnitude of the weight and spring rotational moments of the preliminary configuration of a tension spring counter balance mechanism of FIG. 5 as the center of gravity is rotated from a vertical to a horizontal position.

FIG. 7 is a graphical illustration of the relative magnitude of the weight and spring rotational moments of the preliminary configuration of the spring counter balance mechanism as the center of gravity is rotated from a vertical to a horizontal position. As previously stated, altering the parameters may change the relative shape of the spring moment curve relative to the weight moment curve. However the spring moment curve is representative of a preferable solution where the dock leveler 12 is balanced to the preferable value at the horizontal position. The dock leveler 12 is slightly downwardly biased so that it remains in contact with a transport vehicle as it moves up or down with deflection of the suspension.

As shown in FIG. 7, the spring counter balance moment decreases as the dock leveler 12 rotates below horizontal. Thus the dock leveler 12 becomes more difficult to lift as it rotates to a lower position. If the spring parameters are selected to approximate the weight balance curve, another characteristic is that the dock leveler 12 become more upwardly biased as the dock leveler 12 rotates to the stored vertical position. This makes the dock leveler 12 difficult to lower from the stored position. The third undesirable characteristic is that after the operator has overcome the upward bias at the stored position, the dock leveler 12 will fall all the way down until it rests on the transport vehicle. Depending on the spring parameters, the fall may be quite rapid and may be perceived as a safety concern.

The lower curve illustrated in FIG. 7 is the difference between the clockwise weight moment and the counterclockwise spring moment. Values above the zero line represent positions of upward bias and those below the zero line represent positions of downward bias. Thus it is shown that the operator must push the dock leveler 12 away from the stored position and then it will fall all the way to the bed of the transport vehicle. Conversely, to store the dock leveler 12, the operator must lift it almost all the way to the stored vertical position.

Figure 8:
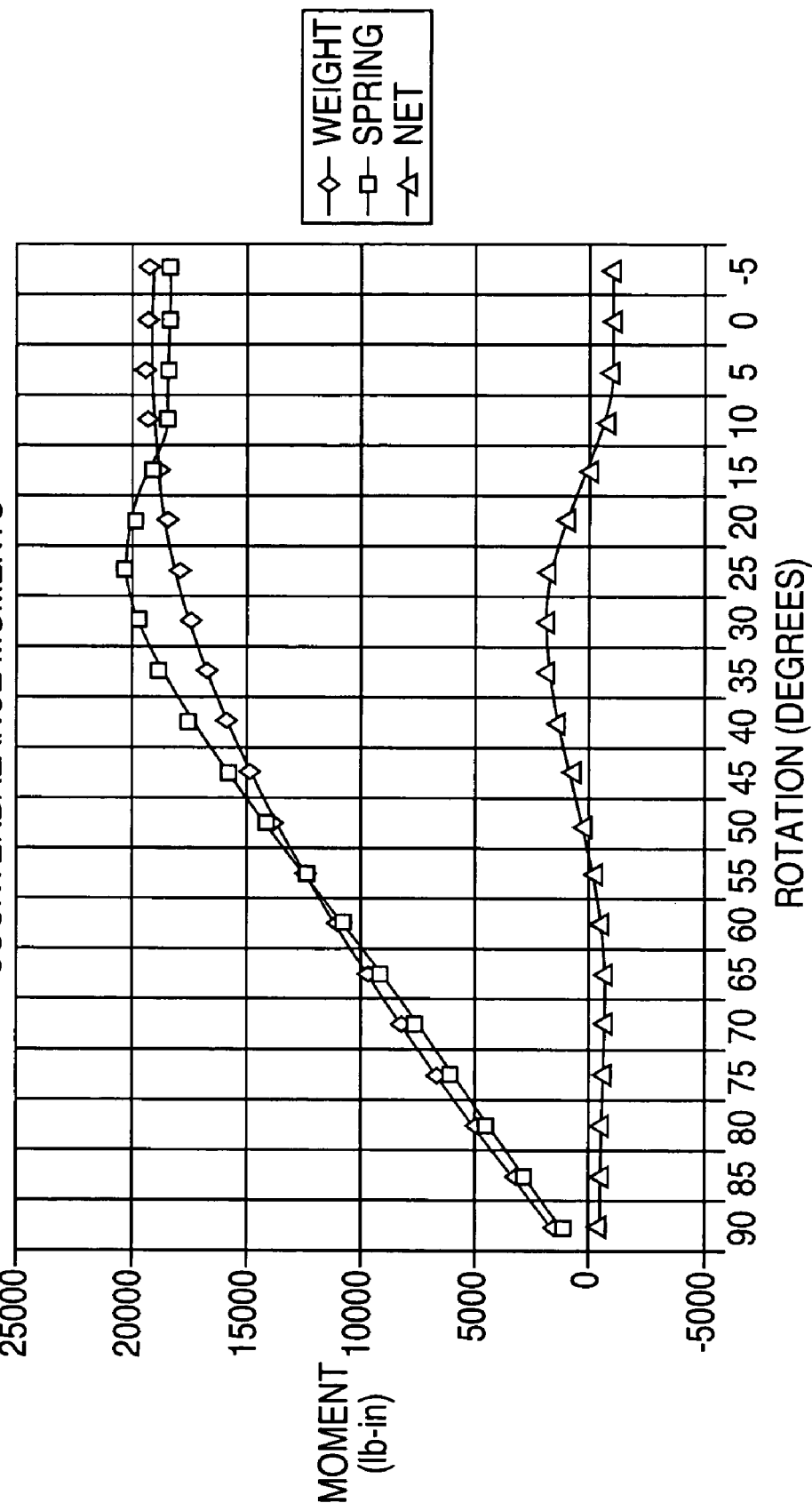
FIG. 8 is a graphical illustration of an exemplary net moment profile in accordance with the present invention, resulting from the weight and spring rotational moments as the center of gravity is rotated from a vertical to a horizontal position.

FIG. 8 is a graphical illustration of the relative magnitude of the weight and spring rotational moments of an embodiment according to the present invention. As illustrated in FIG. 1, the upward spring counter balance moment is the product of the spring force F and the distance a' from the pivot shaft 36 to the line of force 60 of the spring 48. The spring parameters are preferably selected to provide the desired counter balance force.

FIG. 3 illustrates an embodiment of the present invention with the dock leveler 12 rotated upward to the vertical stored position. The chain 72 contacts the cam surface 52 and is thus deflected away from a direct line between the anchor hole 50 and the spring anchor bracket 42 on the dock leveler 12. Thus the distance b" and therefore the spring moment are reduced relative to the prior art design. Similarly, as illustrated in FIG. 3, when the dock leveler 12 is rotated downward below the horizontal position, the chain 72 contacts the cam surface 54 and is thus deflected above a direct line between the anchor hole 50 and the spring anchor bracket 42 on the dock leveler 12. Thus the distance b'" and therefore the spring moment are increased relative to the preliminary design. A person of ordinary skill will appreciate from the teachings herein that the shape of the cam surfaces 50, 52 can be configured to produce almost any desired value of spring counter balance moment for various positions of rotation of the dock leveler 12.

A benefit of an embodiment according to this invention is illustrated by the graph in FIG. 8. As illustrated by the right side of the graph, as the dock leveler 12 rotates below the horizontal position, the spring moment remains a uniform amount below the weight moment. This can ensure that the dock leveler 12 remain in contact with the bed of the transport vehicle, yet is not more difficult to raise from a lower position.

As illustrated by the left side of the graph, when the dock leveler 12 is rotated to the vertical stored position, the spring moment remains slightly lower than the weight moment. This has a benefit for the operator while raising and lowering the dock leveler 12. The spring parameters and the shape of the upper cam surface 52 can be selected so that when the dock leveler 12 is released from the stored vertical position, it will accelerate downward until it reaches the upward biased region. It may then decelerate and stop before it reaches the horizontal working position. The operator can then step on to the dock leveler 12 and gently force it down onto the bed of the transport vehicle.

There is also a benefit when raising the dock leveler 12 to the stored vertical position. As described above, the weight moment preferably does not increase as the dock leveler rotates below the horizontal position, so that it is easier to lift. When the operator lifts the dock leveler 12 above the working position, the spring moment increases beyond the weight moment so that the dock leveler 12 starts to accelerate upward and with very little effort the operator will be able to lift it up through the slightly downward biased region to the stored vertical position.

As in FIG. 7, the lower curve illustrated in FIG. 8 is the difference between the clockwise weight moment and the counterclockwise spring moment. Values above the zero line represent positions of upward bias and those below the zero line represent positions of downward bias. Thus it is shown that when the operator releases the dock leveler 12 from the stored position, it initially falls toward the bed of the transport vehicle and then decelerates when it reaches the upwardly biased region. When the operator forces the dock leveler beyond the upwardly biased region it falls on to the bed of the transport vehicle. Conversely to store the dock leveler 12, the operator is required only to lift it to the upwardly biased region and then with the assistance of the upward bias force easily move the dock leveler 12 through the slightly downward biased region to the stored vertical position.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dock leveler, comprising:
a base assembly;

a ramp assembly configured to rotate from a generally vertical stored position to one or more lowered operating positions, wherein the ramp assembly is pivotally coupled to said base assembly at a pivot point located generally at one end of the ramp assembly; and, a counterbalance assembly comprising:
   a first anchor point;
   a second anchor point;
   a flexible member and,
   a biasing member having a central longitudinal axis defining a line of action, wherein the biasing member is coupled at one end to the ramp assembly at said first anchor point and to the flexible member at an other end of the biasing member, and the flexible member is connected to the base assembly or a dock at the second anchor point, and wherein along the line of action, at least one effective anchor point is defined as a point on the line of action proximate to a contact point between the flexible member and a cam surface.

2. A dock leveler according to claim 1, wherein the biasing member is a spring.

3. A dock leveler according to claim 1, wherein the flexible member is chosen from a chain, a cable, and a band.

4. A dock leveler according to claim 3, wherein the flexible member is a chain.

5. A dock leveler according to claim 1, wherein the base assembly comprises a cam plate defining the cam surface and shaped to deflect the line of action as the ramp assembly rotates by selectively engaging the flexible member.

6. A dock leveler according to claim 5, wherein the biasing flexible member is coupled at the second anchor point to the base assembly.

7. A dock leveler according to claim 5, wherein the biasing member is a spring and the cam plate includes an anchor hole at which the spring is fixedly coupled to the base assembly via the flexible member, an upper cam surface having a shape, and a lower cam surface having a shape, wherein the upper cam surface, lower cam surface, anchor point, and flexible member cooperate to deflect the line of action as the ramp assembly rotates.

8. A dock leveler according to claim 7, wherein the ramp assembly has a weight moment and the shape of the lower cam surface is configured to provide a spring moment that is less than the weight moment of the ramp assembly when the ramp assembly is in one or more lowered operating positions.

9. A dock leveler according to claim 7, wherein the ramp assembly has a weight moment and the shape of the upper cam surface is configured to provide a spring moment that is greater than the weight moment of the ramp assembly at least as the ramp assembly rotates above the operative position.

10. A dock leveler according to claim 9, wherein the shape of the upper cam surface is configured to provide a spring moment that is approximately equal to the weight moment of the ramp assembly when the ramp assembly is in the stored position.

11. A dock leveler according to claim 7, wherein the one or more lowered operating positions are in a generally horizontal working range, the dock leveler has a net moment which can vary as the ramp assembly rotates, and the net moment is relatively constant in the generally horizontal working range, and the net moment is in the upward direction through a region between the generally horizontal working range and the vertical stored position.

12. A dock leveler according to claim 11, wherein the net moment is approximately zero at a position between the vertical stored position and the one or more operative positions.

13. A dock leveler according to claim 11, wherein the generally horizontal working range includes positions where an end of the ramp assembly is about eight inches above horizontal to a position where the end of the ramp assembly is about eight inches below horizontal.

14. A counterbalance assembly for a mechanically-operated, vertically-storing dock leveler having a rotating ramp assembly, comprising:
   ramp means configured to pivot generally about one end of the ramp means;
   tension means for counterbalancing the ramp means of a dock leveler, wherein the tension means has a first end and a second end;
   means for fixedly coupling said first end of said tension means to the ramp means at a first anchor point;
   means for flexibly coupling said second end of said tension means to a base assembly of the dock leveler at a second anchor point, wherein the first anchor point and second anchor point define a direct line of action; and,
   means for camniing configured to selectively engage the means for flexibly coupling along a side of the flexibly coupling means when the ramp means is located such that the tension means is deflected away from the direct line of action when the tension means and the tension means is operatively connected to the means for flexibly coupling and the ramp assembly rotates,
   wherein counterbalance characteristics of the ramp means change as the position of the ramp means changes and the tension means is deflected away from the direct line of action.

15. A counterbalance assembly according to claim 14, wherein the tension means is a spring.

16. A counterbalance assembly according to claim 15, wherein the means for fixedly coupling said first end comprises an adjusting bolt and a spring anchor bracket, and wherein the means for flexibly coupling said second end comprises a flexible tensile member chosen from a chain, a band, and a cable.

* * * * *

UNITED STATES PATENT AND TRADEMARK OFFICE
CERTIFICATE OF CORRECTION

PATENT NO.         : 7,017,220 B2
APPLICATION NO. : 10/664971
DATED                  : March 28, 2006
INVENTOR(S)        : James C. Alexander et al.

It is certified that error appears in the above-identified patent and that said Letters Patent is hereby corrected as shown below:

COL. 10,

Claim 14, line 36, please replace "camniing" with --camming--;

line 38, after "is located" insert --in a manner--; and line 40, delete "when the tension means."

Signed and Sealed this

Twenty-second Day of August, 2006

JON W. DUDAS
*Director of the United States Patent and Trademark Office*